No. 881,339. PATENTED MAR. 10, 1908.
I. POVALL.
BRACKET.
APPLICATION FILED MAY 14, 1906.

Attest:
L. L. Reibrock.
W. E. Ellis.

Inventor:
Isaac Povall,
By Hedwech
Atty

UNITED STATES PATENT OFFICE.

ISAAC POVALL, OF DES MOINES, IOWA.

BRACKET.

No. 881,339.  Specification of Letters Patent.  Patented March 10, 1908.

Application filed May 14, 1906. Serial No. 316,875.

*To all whom it may concern:*

Be it known that I, ISAAC POVALL, a subject of the King of England, and resident of Des Moines, Polk county, Iowa, have invented a new and useful Bracket, of which the following is a specification.

The object of this invention is to provide improved means for detachably connecting two members, such as a table and leg, a post and brace, and similar devices.

My invention consists in the construction, arrangement and combination of elements hereinafter set forth, pointed out in my claims and illustrated by the accompanying drawing, in which—

Figure 1:
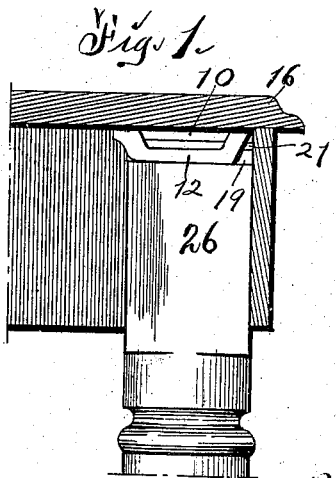
Figure 2:
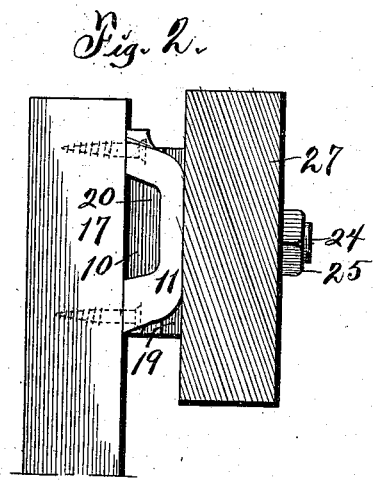
Figure 3:
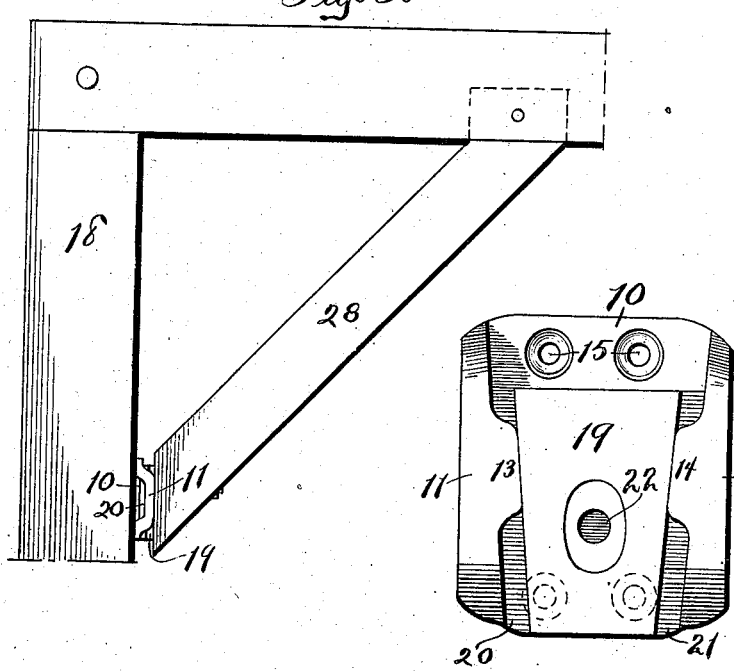
Figure 4:
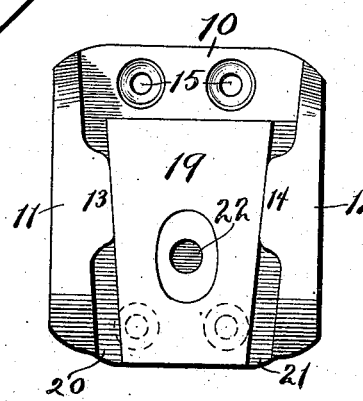
Figure 5:
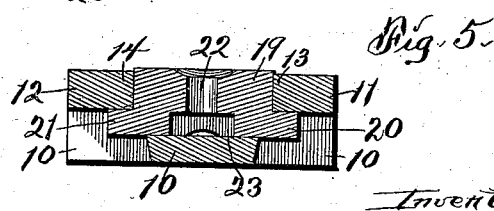

Figure 1 is an elevation, partly in section, illustrating my improved device as employed to connect a table and leg. Fig. 2 is an elevation, partly in section, showing my improved device as employed to connect a studding and joist. Fig. 3 is an elevation illustrating my improved device as employed to connect a post and brace. Fig. 4 is a face view illustrating the complete bracket, and Fig. 5 is a cross-section of the same.

In the construction of the device as shown the numeral 10 designates a socket member, preferably made of metal by molding, and formed with marginal flanges 11, 12, the inner faces of said flanges opposite each other and in converging planes. Lugs 13, 14 are formed on and extend toward each other from the central portions of the flanges 11, 12 and the inner faces of said lugs are spaced apart from the outer face of the member 10. The member 10 also is formed with a plurality of screw-holes 15 adapted to admit screws as shown by dotted lines in Fig. 2 to secure the said member to a support such as a table 16, studding 17 or post 18. A key-member 19 is provided and preferably is formed of metal by molding. The key-member 19 has its side margins in converging planes and is formed with ribs 20, 21 projecting laterally from said side margins and having their outermost margins in converging planes. The extreme width of the key-member and ribs conforms to the width of the member 10 between the marginal flanges 11, 12 and the thickness of the ribs conforms to the space between the inner faces of the lugs 13, 14 and the outer face of the socket member. The key-member 19 is formed with a central bolt-hole 22 opening at the inner face of said member to a square cavity 23 adapted to contain the head of a bolt 24, said bolt and a nut 25 adapted to secure said key-member to a table-leg 26, a joist 27, or a brace 28.

The socket-member 10 may be mounted on one device in any desired position, dependent on the direction in which strain is to be applied thereto, and the key-member 19 may be applied to a mating device in corresponding position to enter and by strain or weight engage the socket-member. As the strain increases as by increase of weight or jarring in use, the key-member engages more firmly in the socket member, and yet may be readily and conveniently removed therefrom when it is desired to disconnect the devices carrying the bracket-members.

I claim as my invention—

1. A bracket, comprising a socket member, marginal flanges on said socket member and having their inner faces formed in converging planes, lugs on said flanges and spaced apart from the socket member, the inner faces of said lugs being parallel with the opposite face of the socket member, and a key member having ribs on its side margins, said ribs adapted to enter freely between the lugs and socket member and the body of the key member extending outward beyond the outer faces of the lugs, the converging margins of the ribs adapted to engage the converging inner faces of the flanges on the socket member, and the lugs adapted to engage the key member.

2. A bracket, comprising a socket-member formed with converging grooves opposite each other, said grooves square in cross-section, said socket-member also formed with screw holes, and a key-member formed with converging marginal flanges, said flanges also square in cross-section and adapted for longitudinal seating in said grooves, the outer face of the key-member being outside the plane of the outer face of the socket-member, the side margins of said key-member being in converging planes and adapted to enter between and engage the opposite sides of the socket-member outside the converging grooves, said key-member also formed with a central bolt hole having a counter-sink 23 angular in cross-section at its inner end and adapted to receive a square-headed bolt whereby the key-member may be attached to an object.

Signed by me at Des Moines, Iowa, this sixth day of May, 1905.

ISAAC POVALL.

Witnesses:
 D. POVALL,
 S. C. SWEET.